Figure 1:
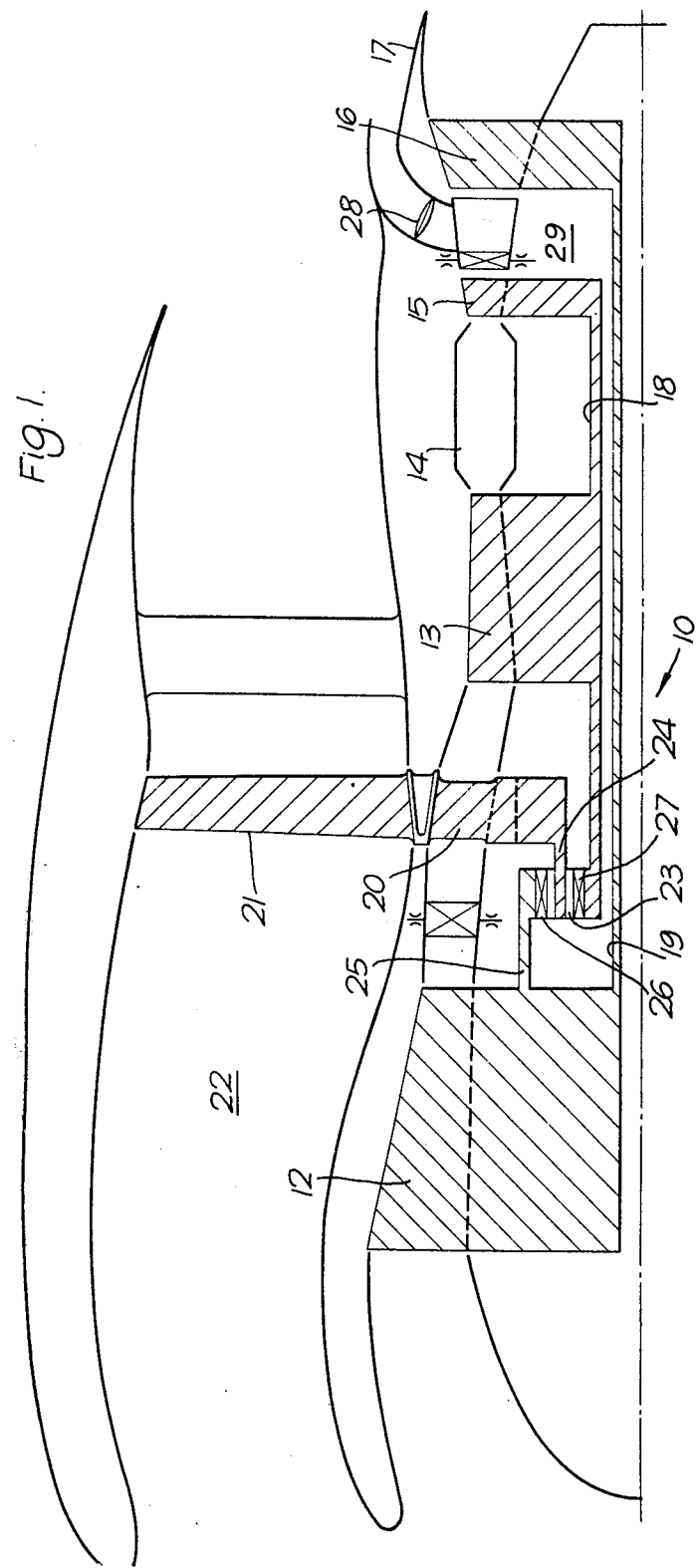

United States Patent [19]

Scott et al.

[11] 4,005,575
[45] Feb. 1, 1977

[54] DIFFERENTIALLY GEARED REVERSIBLE FAN FOR DUCTED FAN GAS TURBINE ENGINES

[75] Inventors: Alexander Scott; Peter Eric Peck, both of Bristol, England

[73] Assignee: Rolls-Royce (1971) Limited, England

[22] Filed: Sept. 3, 1975

[21] Appl. No.: 609,931

[30] Foreign Application Priority Data

Sept. 11, 1974  United Kingdom ............ 39694/74

[52] U.S. Cl. ............................... 60/226 R; 60/268;
60/39.16 C; 417/315; 417/408; 415/61
[51] Int. Cl.² ...................... F02K 3/04; F02C 3/06
[58] Field of Search .............. 60/39.16 C, 39.16 S, 60/226 A, 226 R, 268; 417/16, 315, 374, 408; 415/61

[56]  References Cited
UNITED STATES PATENTS

| 2,423,183 | 7/1947 | Forsyth | 60/268 |
|---|---|---|---|
| 2,599,058 | 6/1952 | Johansen et al. | 60/39.16 C |
| 2,619,797 | 12/1952 | Haworth | 60/39.16 C |
| 3,507,113 | 4/1970 | Herrmann et al. | 60/39.16 S |
| 3,729,957 | 5/1973 | Petrie et al. | 60/39.16 C |
| 3,861,139 | 1/1975 | Jones | 60/39.16 C |

*Primary Examiner*—William L. Freeh
*Assistant Examiner*—Robert E. Garrett
*Attorney, Agent, or Firm*—Stevens, Davis, Miller & Mosher

[57]  ABSTRACT

A ducted fan gas turbine engine comprises a pair of turbines in flow series which are contra-rotating and which drive shafts which in turn drive into an epicyclic gear. The output from the epicyclic gear drives a fan which normally provides forward thrust from the engine. The fan can be made to rotate in the opposite direction to provide reverse thrust by varying the relative speeds of rotation of the two turbines by bleeding working fluid from between them.

8 Claims, 2 Drawing Figures

DIFFERENTIALLY GEARED REVERSIBLE FAN FOR DUCTED FAN GAS TURBINE ENGINES

This invention relates to gas turbine engines and relates in particular to a mechanism for reversing the direction of rotation of the fan of a ducted fan gas turbine engine.

It is well known that under certain operating conditions such as an "approach" or "landing" it is desirable to reverse the direction of airflow or gas flow issuing from the engines of an aircraft to provide a degree of braking on the aircraft.

In the case of ducted fan engines it is known that it is possible to reverse the direction of the fan efflux in either one of two ways. The presently accepted way of reversing the airflow is by means of a variable pitch fan, in which case the pitch angle of the individual fan blades is altered to substantially reverse the direction of the airflow passing through the engine fan duct. However, the mechanism required for varying the pitch of the fan blades adds considerably to the complexity of the engine.

An alternative way of reversing the fan efflux is by reversing the direction of rotation of the fan. However this has not been adopted as a practical proposition because of the complexity of the gear mechanism and actuation system required.

The present invention concerns a fan reversing mechanism in which a relatively simple mechanism can be used and the above-mentioned disadvantages are reduced.

According to the present invention a ducted fan gas turbine engine comprises a fan, two shafts, a turbine drivingly connected to each shaft, and a gear mechanism, wherein the two shafts are arranged to drive into the gear mechanism in opposite directions, the output of the gear mechanism is connected to drive the fan, the gears of the gear mechanism are arranged so that a given change of the relative speeds of rotation of the two shafts causes a reversal of the direction of rotation of said output, and means are provided for varying the relative speeds of rotation of the shafts to achieve said given change of relative speeds of rotation thereof.

Preferably the gear mechanism is an epicyclic gear and each of the contra-rotating shafts are provided with gears to provide respectively a sun wheel and an outer annulus gear. A plurality of planet gears are arranged between the sun wheel and annulus gear and are supported within a cage which is adapted to transmit drive to the fan.

According to one embodiment of the invention the teeth of the annulus gear are formed upon the internal surface of the radially outermost shaft, and the teeth of the sun wheel are formed upon the external surface of the radially innermost shaft.

Alternatively the radially outermost shaft may be arranged to have an extension having a surface extending axially and radially inwardly of the radially innermost shaft, said surface carrying the sun wheel, and the radially innermost shaft carrying the outer annulus gear.

The gas turbine engine of the invention is capable of two modes of operation, during one mode of operation the fan is driven through the plurality of planet gears such that the air being displaced by the fan serves to augment the exhaust gas flow of the engine, and during a second mode of operation the direction of rotation of the fan is reversed by reducing the speed of one of the contra-rotating shafts and increasing the speed of the other shaft such that the air being displaced by the fan is moved in a direction opposite to the exhaust gas flow of the engine.

In a preferred form of the invention one of the two coaxially arranged shafts carries the engine low pressure turbine and compressor, and the other of the two coaxially arranged shafts carries the intermediate or high pressure turbine and compressor.

Also preferably the speeds of the two shafts carrying the engine turbines are varied by bleeding off some of the working fluid between turbines. This has the effect of increasing the pressure drop across the upstream turbine thus increasing its speed, and reducing the pressure drop across the downstream turbine thus reducing its speed.

Figure 2:
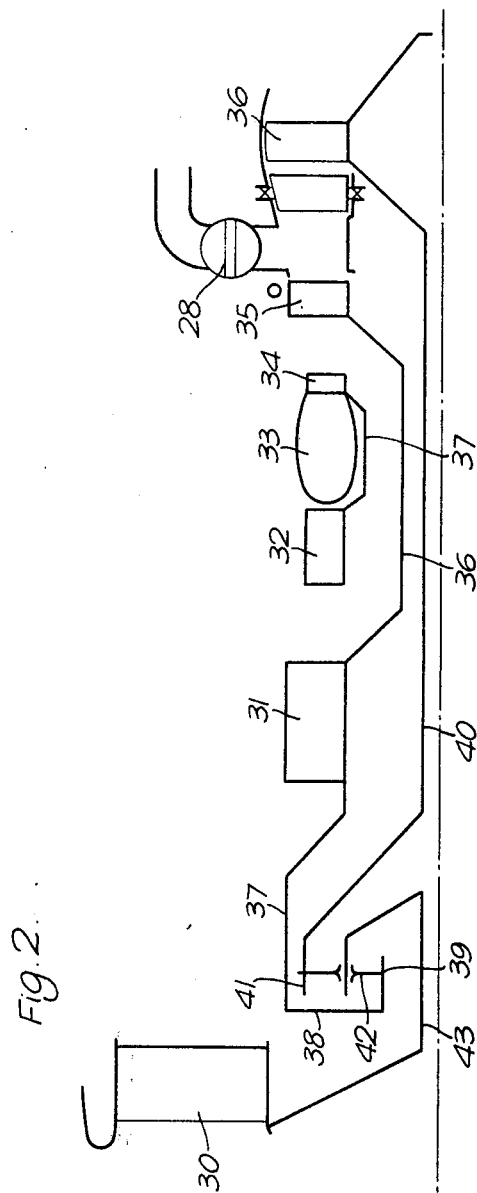

Various embodiments of the invention will now be more particularly described, by way of example only, and with reference to the accompanying drawings in which:

FIG. 1 shows a diagrammatic view, partly in section, of a portion of a ducted fan type gas turbine engine having a fan reversing mechanism made in accordance with the present invention, FIG. 2 shows a schematic representation of a ducted fan type gas turbine engine including a further embodiment of a fan reversing mechanism made in accordance with the present invention.

Referring to FIG. 1 of the drawing, a ducted fan type gas turbine engine shown generally at 10 comprises in flow series a low pressure compressor 12, a high pressure compressor 13, a combustion system 14, a high pressure turbine 15, a low pressure turbine 16, the engine terminating in a convergent exhaust nozzle 17. The high pressure compressor 13 and the high pressure turbine 15 are rotatably mounted upon a common shaft 18, and the low pressure compressor 12 and the low pressure turbine 16 are rotatably mounted upon a common shaft 19.

Situated between the low pressure compressor 12 and the high pressure compressor 13 is a row of rotating spokes 20 which form the radially innermost portion of a fan 21 which is rotatably mounted within an annular fan duct 22. The rotating spokes 20 and hence the fan 21 are connected through the root portions of the spokes 20 to the planet carrier 24 of an epicyclic gear.

As can be seen from the drawing the epicyclic gear consists of a plurality of planet gears 23 which are driven by means of a sun gear 27 and a surrounding annulus gear 26 which are in turn respectively driven by the two shafts 18 and 19. In this example, the sun gear 27 is formed upon an axial extension of shaft 18 carrying the high pressure compressor and turbine rotors 13 and 15, and the annulus gear 26 is formed upon an auxiliary portion 25 of the shaft 19 which carries the low pressure compressor 12 and the low pressure turbine 16.

Between the turbines 15 and 16 is a space 29 and a duct is provided which communicates with the space via a butterfly valve 28. Opening of the butterfly valve 28 allows working fluid to be bled from the space 29 to vary the speeds of rotation of the turbines 15 and 16 and hence of the shafts 18 and 19.

During operation of the engine for normal forward propulsion the shafts 18 and 19 are arranged to rotate in opposite directions and at different speeds. The gear ratios of the annulus gear 26, the planet gears 23 and the sun wheel 27 are chosen such that the fan 21 rotates within the fan duct such as to displace the air within the duct in a manner which augments the thrust of exhaust gases issuing from the exhaust nozzle 17.

If however it is desired to reverse the air flow within the fan duct in order to provide braking upon an aircraft when landing, the valve 28 is pivoted to bleed a portion of the exhaust gas from the space 29. This reduces the pressure in the space 29 so slowing down the rotational speed of the low pressure turbine 16 and increasing the rotational speed of the high pressure turbine 15 because of the greater pressure drop through it. It will therefore be appreciated that by suitable bleeding of the exhaust gas the rotational speeds of the shafts 18 and 19 may be adjusted such that the epicyclic gearing will cause the direction of rotation of the fan 21 to be reversed thus reversing the direction of air displacement in the fan duct.

A typical numerical example of the shaft speeds achievable with the above described embodiment is as follows:

Using the nomenclature $N_b$ is the rotational speed of the low pressure shaft and annulus gear 26.

$N_a$ is the rotational speed of the high pressure shaft and sun gear.

$N_c$ is the rotational speed of the planet carrier and fan.

$R_{xy}$ is the ratio of the speeds of the suffixed components $R_o$ is the ratio of the speeds of the shafts a and b when the planet carrier is fixed.
and making the assumption that $R_o = -7/5$ (the negative sign indicates that the shafts would rotate in in opposite directions).

$N_b = +8,000$ r.p.m. in the forward mode.

$N_a = -21,000$ r.p.m. in the forward mode,
and the gas bleed from between the turbines is such as to change these speeds to $N_b = +9,500$ r.p.m. in the reverse mode and $N_a = -6,000$ r.p.m. in the reverse mode.

Considering shaft $b$ fixed $$N_a/N_c = R_{ac} = 1 - R_o = 1 - (-7/5) = 12/5$$

$$N_c = N_a/R_{ac} = -21,000 \times 5/12 = -8,750 \text{ r.p.m.}$$

Now consider shaft a fixed $N_b/N_c = R_{bc} = R_o - 1/R = 12/7$ $$N_c = N_b/R_{bc} = 8,000 \times 7/12 = 4,670 \text{ r.p.m.}$$

The true rotation of $c$ is the algebraic sum of these figures $$= 4,670 - 8,750 = -4,080 \text{ r.p.m.}$$

In the reverse mode:
Considering $b$ fixed $$N_c = -6,000 \times 5/12 = -2,500 \text{ r.p.m.}$$

Considering a fixed $$N_c = +9,500 \times 7/12 = 5,540 \text{ r.p.m.}$$

The true rotation of $c$ is thus $5,540 - 2,500 = 3,040$ r.p.m. Hence a change in rotational speed from $-4,080$ r.p.m. producing forward thrust 3,040 r.p.m. producing reverse thrust can be simply provided by this means.

In addition to the reverse thrust produced by the fan the forward thrust from the normal hot gas exhaust in the reverse mode is very much reduced because of the air bleed from the turbines, and the reverse thrust may be enhanced by ejecting the bleed air to the atmosphere through a forwardly directed auxiliary nozzle.

FIG. 2 shows a schematic representation of a ducted fan engine including a further embodiment of the present invention. The engine includes in flow series a front fan 30, a low pressure compressor 31, a high pressure compressor 32, a combustion chamber 33, a high pressure turbine 34, a low pressure turbine 35 and a free turbine 36. The high pressure compressor and turbine 32 and 34 are rotatably mounted upon a common shaft 37. The low pressure compressor 31 and turbine 35 are rotatably mounted upon a common shaft 36 which is provided with an additional extension 37 which carries a radially extending member 38 upon the inner periphery of which is disposed a radially outwardly extending annulus of gear teeth 39.

The free turbine 36 is rotatably mounted upon a shaft 40, on a portion of which is disposed a radially inwardly extending annulus of gear teeth 41. The two respective annuli of gear teeth 39 and 41 engage with a common set of planet gears 42, the cage of which is adapted to transmit drive to the fan 30 by means of shaft 43.

In operation the embodiment shown at FIG. 2 works in a similar manner to that of the embodiment shown at FIG. 1 by bleeding hot gas from between turbines 35 and 36 through a valve 28. Typical shaft speeds obtainable with this embodiment are:

| | |
|---|---|
| Free turbine shaft 40, | + 12,000 r.p.m. forward mode |
| | + 1,500 r.p.m. reverse mode |
| Low pressure shaft 36, | − 8,000 r.p.m. forward mode |
| | − 9,500 r.p.m. reverse mode |
| Fan shaft 43, | + 4,000 r.p.m. forward mode |
| | − 2,900 r.p.m. reverse mode |

Clearly there are many variations of engine cycle which may be adopted using the principle behind the present invention. For example, the fan may be located at the front, middle or rear of the engine. It may be of more than one stage with the stages being spaced apart to provide a combination of the above locations.

The gear may be any form of suitable epicyclic gear having simple or compound planets.

Hence it can be seen that the mechanism for producing the reversing of the fan is relatively simple and requires no hydraulic change-over mechanism and feedback systems as required by variable pitch fans, and no complex gear changing mechanism as would be required in a reversing gearbox.

We claim:

1. A ducted fan gas turbine engine comprising a fan, two shafts, a turbine drivingly connected to each shaft for driving the shafts in opposite rotational directions, and a gear mechanism, wherein the two shafts are connected with the gear mechanism, the output of the gear mechanism being connected to drive the fan, the gears of the gear mechanism being arranged so that a given change of the relative speeds of rotation of the two shafts causes a reversal of the direction of rotation of said output, and means for varying the relative speeds of rotation of the shafts for achieving said given change of relative speeds of rotation thereof.

2. A ducted fan gas turbine engine as claimed in claim 1 and in which the means for varying the relative speeds of rotation of the shafts comprises means for bleeding working fluid from between the two turbines to vary the pressure drop simultaneously across each turbine.

3. A ducted fan gas turbine engine as claimed in claim 1 and in which the gear mechanism is an epicyclic gear, comprising a sun gear, an annulus gear and a plurality of planet gears supported in a cage, the contra-rotating shafts being provided with gears which constitute the sun and annulus gears of the epicyclic gear, the cage connected for transmitting drive to the fan.

4. A ducted fan gas turbine engine as claimed in claim 1 and which includes low pressure and high pressure compressors and turbines and wherein the two shafts are concentric and contra-rotating, one of the two shafts carrying the low pressure compressor and the low pressure turbine, the other of the two shafts carrying the high pressure compressor and turbine.

5. A ducted fan gas turbine engine as claimed in claim 3 and in which the teeth of the annulus gear are formed on an internal surface of the radially outer shaft and the teeth of the sun gear are formed on an external surface of the radially inner shaft.

6. A ducted fan gas turbine engine as claimed in claim 1 and which includes a high pressure compressor drivingly connected by a shaft to a high pressure turbine, a low pressure compressor drivingly connected by a shaft to a low pressure turbine and a free turbine downstream of the low pressure turbine, wherein the shaft connecting the low pressure turbine and compressor constitutes a first one of the two shafts connected with the gear mechanism, and the free turbine is connected to the gear mechanism by a shaft which constitutes the second of the two shafts, said second of the two shafts extending concentrically through the first of the two shafts and contra-rotating in relation thereto.

7. A ductd fan gas turbine engine as claimed in claim 8 and in which the teeth of the annulus gear are formed on an internal surface of the second of the two shafts, and the teeth of the sun gear are formed on an external surface of an extension of the first of the two shafts.

8. A ducted fan gas turbine engine as claimed in claim 6 and in which the gear mechanism is an epicyclic gear, comprising a sun gear, an annulus gear and a plurality of planet gears supported in a cage, the contra-rotating shafts being provided with gears which constitute the sun and annulus gears of the epicyclic gear, the cage connected for transmitting drive to the fan.

* * * * *